United States Patent [19]

Delaney

[11] 4,023,164

[45] May 10, 1977

[54] HEAT DETECTION AND ALARM SYSTEM

[75] Inventor: Larry R. Delaney, Cheswick, Pa.

[73] Assignee: Bituminous Coal Research, Inc., Monroeville, Pa.

[22] Filed: Dec. 29, 1975

[21] Appl. No.: 644,948

[52] U.S. Cl. .............................. 340/418; 340/227.1; 340/229

[51] Int. Cl.[2] .................. G05D 23/12; G08B 17/04

[58] Field of Search ............... 340/418, 417, 227.1, 340/229

[56] References Cited

UNITED STATES PATENTS

| | | | |
|---|---|---|---|
| 2,522,248 | 9/1950 | Bair | 340/229 |
| 2,972,132 | 2/1961 | Putney | 340/229 |
| 3,014,206 | 12/1961 | Slavin | 340/227.1 |
| 3,119,368 | 1/1964 | Barnard | 340/229 |

*Primary Examiner*—Glen R. Swann, III
*Attorney, Agent, or Firm*—Stanley J. Price, Jr.; John M. Adams

[57] ABSTRACT

A pressurized source of fluid, either liquid or gas, is supplied through a supply conduit system to a main heat sensitive conduit fabricated from a thermoplastic material and having sealed end portions positioned adjacent a potential source of fire or undesirably high temperature. A plurality of branch heat sensitive conduits are connected to the main conduit and extend therefrom into substantially abutting relation with the object to be monitored. The supply conduit system maintains a selected fluid pressure within the heat sensitive conduits which are operable to soften and rupture at a preselected temperature, as determined by the system pressure and the diameter and wall thickness of the heat sensitive conduits. When exposed to the excessive preselected temperature, the conduits rupture. A pressure switch connected to the supply conduit system is responsive to a decrease in the fluid pressure and is operable to complete an electrical circuit between an electrical power source and an alarm device for actuating the alarm. Actuation of the alarm device indicates the existence of an undesirably high temperature and may initiate an automatic shutdown procedure. The pressurized fluid may contain a fire retardant material which, upon rupture of any one of the heat sensitive conduits, is discharged to either reduce an undesirably high temperature or extinguish a fire simultaneously with actuation of the alarm.

7 Claims, 3 Drawing Figures

HEAT DETECTION AND ALARM SYSTEM

BACKGROUND OF THE INVENTION

This invention relates to a heat detection and alarm apparatus, and more particularly, to a plurality of heat sensitive conduits having sealed end portions in which a fluid is maintained at a preselected pressure therein so that the conduits rupture when exposed to an undesirably high temperature to actuate an alarm and discharge the fluid.

Fire protection systems, and particularly fire sprinkler alarm systems, as illustrated and described in U.S. Pat. Nos. 941,048; 2,166,264; 2,880,808; 2,891,625 and 3,180,422, are well known in the art and generally include a water conduit having one end portion communicating with a source of water under pressure. One or more sprinkler heads are supported by the water conduit and are operable when exposed to heat above a desired level, to release a closure plug from an outlet opening of the sprinkler head to allow water, under pressure, to flow therefrom. In combination with the control valve, an electrical switch, responsive to the fluid pressure through the sprinkler head outlet, actuates an electrical alarm circuit. In this manner, an alarm is given almost simultaneously with the actuation of one of the sprinkler head assemblies.

In each of the above enumerated patents, the sprinkler head assemblies are supported by the conduit that is connected to a source of water under pressure and is removed a substantial distance from the object to be sprayed. In most cases, the sprinkler head assemblies are positioned at the ceiling level. Therefore, a substantial increase in the temperature of any object on the floor is required before the sprinkler head is actuated and the fluid discharged to reduce the temperature of the object or extinguish a flame. This is an undesirable feature, particularly because the sprinkler head is not actuated until the object has reached the combustion temperature. As a result, an object located substantially remote from the sprinkler head assemblies can ignite without actuating the assemblies and not until the temperature in the area adjacent the assemblies reaches an excessive level is the assembly actuated. At this stage, substantial damage has already occured.

There is a need for a heat detection and alarm apparatus that is adaptable to detect temperatures in excess of a preselected temperature and actuate an alarm to indicate the occurrence of the alarm condition and simultaneously discharge a flame retardant material to reduce an excessive temperature or extinguish a fire. While it has been suggested by the prior art systems to provide heat sensitive sprinkler head assemblies that are actuated, upon the occurrence of fire, to discharge a fire extinguishing spray, none of the systems permit the detection of an undesirably high temperature by location of a detection device in substantially abutting relation with the object to be monitored.

SUMMARY OF THE INVENTION

In accordance with the present invention, there is provided a heat detection and alarm apparatus that includes a pressurized source of fluid. A heat sensitive conduit, having sealed end portions, is connected to the pressurized source of fluid by a conduit system. The conduit system maintains a preselected fluid pressure in the heat sensitive conduit so that the conduit is operable to rupture when the temperature thereof exceeds a preselected level. An alarm device responsive to a decrease in the fluid pressure within the heat sensitive conduit upon rupture transmits a signal to indicate the presence of an alarm condition which may be either a flame or an undesirably high temperature. A pressure responsive device is connected to the alarm and to the conduit system and is operable to maintain the alarm device in a normally deactivated condition. The pressure responsive device, upon rupture of the heat sensitive conduit and the subsequent reduction of pressure in the conduit system, completes an electric circuit to actuate the alarm device.

A plurality of branch heat sensitive conduits extends from the main heat sensitive conduit in a preselected arrangement into substantially abutting relation with a heat source to be monitored. In a further arrangement, the branch conduits may extend in a plurality of directions from the main conduit to monitor a number of locations for a temperature in excess of a preselected level or the occurrence of fire. The heat sensitive conduits are fabricated of a thermoplastic material, such as polyethylene, and have a preselected diameter and wall thickness. By proper selection of the diameter and wall thickness and the fluid pressure in the conduits, the temperature at which the heat sensitive conduits will soften and rupture can be varied to meet the monitoring conditions. Thus, the temperature at which the conduits soften and rupture is dependent upon the fluid pressure therein; the greater the fluid pressure, the lower the temperature of rupture. If the temperature to which the conduits are exposed exceeds the temperature at which the conduits rupture for a given system pressure, the fluid will be discharged from the conduits and the fluid pressure within the conduit system will be substantially reduced, thereby actuating the alarm device. Furthermore, rupture of any one of the branch conduits at a preselected temperature may actuate a pressure switch of the branch conduit to indicate the location of the undesirably high temperature.

The rupture of the heat sensitive conduits for a given pressure system may take place at a temperature below the combustion temperature of the object to be monitored. The fluid within the system may include a fire retardant material which is discharged upon the source of heat to reduce the temperature of the article to below its combustion temperature or to a safe, predetermined temperature simultaneously with the rupture of the heat sensitive conduit and actuation of the alarm device. Actuation of the alarm, which may be either an audible or visual signal, indicates the presence of an alarm condition and its location. In addition to reducing the temperature of a heat source to a safe, predetermined level, the rupture of one of the heat sensitive conduits may automatically initiate a shutdown procedure and indicate the location of the undesirable temperature or flame.

Accordingly, the principal object of the present invention is to provide a heat detection and alarm apparatus that includes a heat sensitive conduit having a sealed end portion with fluid maintained at a preselected pressure therein so that the conduit will soften and rupture at a preselected elevated temperature, as determined by the system pressure and size of the conduit, and thereby actuate an alarm device to indicate the presence of the undesirable temperature and the location thereof.

Another object of the present invention is to provide a plurality of heat sensitive conduits fabricated from a thermoplastic material and containing a pressurized source of fluid that ruptures on exposure to an undesirably high temperature resulting in a decrease in system pressure and actuation of a suitable alarm to indicate the occurrence of the alarm condition.

A further object of the present invention is to provide a plurality of heat sensitive conduits fabricated of a thermoplastic material and subjected to a continuous preselected fluid pressure such that rupture of the conduits takes place when exposed to a preselected elevated temperature to discharge a fire retardant fluid upon the heat source to reduce the temperature and prevent the occurrence of fire.

An additional object of the present invention is to provide a heat detection and alarm system that includes a plurality of pressurized heat sensitive conduits arranged in surrounding relation with a heat source and operable to rupture at a given temperature for a preselected fluid pressure maintained therein resulting in a decrease in the fluid pressure and actuation of an alarm through a pressure responsive device to indicate the occurrence of either an undesirably high temperature or combustion and the location of the alarm condition.

These and other objects and advantages of the present invention will be more completely described and disclosed in the following specification, the accompanying drawings and the appended claims.

DESCRIPTION OF THE PREFERRED EMBODIMENTS

Figure 1:
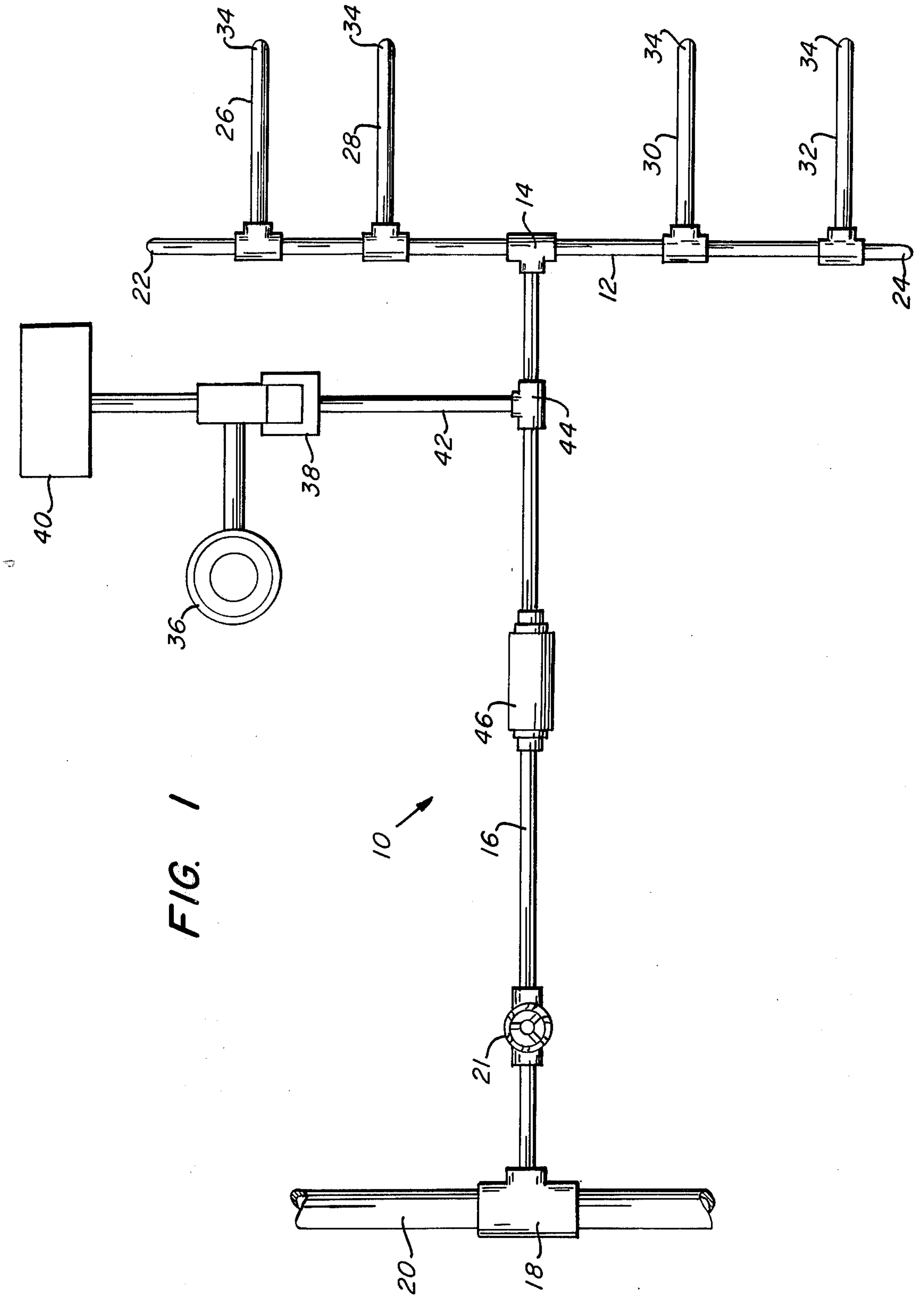
FIG. 1 is a schematic representation of the heat detection and alarm apparatus, illustrating a plurality of pressurized heat sensitive conduits for detecting elevated temperature above a preselected level.

Referring to the drawings and particularly to FIG. 1, there is illustrated a heat detection and alarm apparatus generally designated by the numeral 10 that includes a heat sensitive conduit 12 that is connected by a coupling 14 to a supply conduit 16. The supply conduit 16 is, in turn, connected by a coupling 18 to an input conduit 20. The input conduit 20 conducts a suitable fluid, either liquid or gas, under pressure, from a pressurized source to the supply conduit 16 to maintain a preselected fluid pressure therein. In the case of pressurized liquid, the source may include a city water system, a water storage tank or any suitable container or distributing system. In this manner, a continuous fluid pressure is maintained in the supply conduit 16 and the heat sensitive conduit 12. A conventional control valve 21 is provided on the supply conduit 16 to control the flow of pressurized fluid thereto from the input conduit 20.

The heat sensitive conduit 12 has sealed end portions 22 and 24 and is fabricated from a suitable thermoplastic material, as for example, polyethylene or any other commercially available thermoplastic material. The conduit has a preselected diameter and wall thickness such that the conduit will soften and rupture when exposed to an elevated temperature. The temperature of rupture is also dependent upon the fluid pressure maintained in the sealed conduit 12. The heat sensitive conduit 12 and specifically the end portions 22 and 24 are positioned adjacent a source of heat such as an insulated pipe for transmitting hot fluids or a tank for storing liquids at an elevated temperature. In the event the insulation surrounding the surface of the pipe or heat source exceeds a predetermined safe temperature, the heat sensitive conduit 12 ruptures. Preferably, the fluid is a fire retardant material and, upon rupture of the conduit 12, is discharged upon the source of the undesirably high temperature to lower the temperature and reduce the hazard of fire or extinguish a fire. Thus, for a pipe or tank covered by an insulation material, the occurrence of a hot spot on the surface of the insulation material softens and ruptures the conduit 12. A substantial reduction in the system pressure takes place and results in the actuation of an alarm device, hereinafter explained, to indicate the presence of the undesirably high temperature. The fluid is discharged and, in the case of a fire retardant fluid, the temperature at the hot spot is reduced to below the temperature of combustion.

The conduit 12 may also include a plurality of branch conduits 26, 28, 30 and 32 that are suitably connected to conduit 12. The branch conduits are also fabricated of a heat sensitive thermoplastic material. Each of the branch conduits 26–32 have sealed end portions 34 similar to the end portions 22 and 24 of conduit 12. The branch conduits may be arranged in a preselected pattern to extend from the main conduit 12 with the ends thereof positioned in substantially abutting relation with a source of heat which is to be monitored. In the event the monitored heat source should reach an undesirably high temperature, the branch conduits 26–32 soften and rupture, discharging the fluid and to reduce the system pressure. The temperature at which the heat sensitive conduits rupture is determined by the size of the conduits, that is the diameter and wall thickness, and the fluid pressure maintained therein. Therefore, for a given size conduit a selected pressure is maintained in the conduit so that the conduit will rupture when exposed to a selected undesirably high temperature or the temperature at which a specific material ignites.

The presence of an undesirably high temperature or fire resulting in rupture of the heat sensitive conduit 12 or any one of the individual branch conduits 26–32 is detected by actuation of an alarm device 36 for transmitting a preselected alarm signal. The alarm device 36 is operable to generate a suitable signal, either audible or visual, to indicate the presence of a flame or an undesirable temperature. The alarm device 36 may also include a combination of both audible and visual signal generating means. The alarm device 36 is maintained in a normally deactivated condition by a pressure responsive device 38. The pressure responsive device 38 connects the alarm device 36 to a suitable power source 40, such as an AC electrical source or a battery power cell.

The pressure responsive device 38 is connected by a conduit 42 through coupling 44 to the supply conduit 16. Fluid from the pressurized source is directed from conduit 16 through conduit 42. Thus, the pressure responsive device 38 is exposed to the fluid pressure of the system which maintains the electrical contact of the device 38 in an open position. With the contacts of the pressure responsive device 38 maintained in an open position by the fluid pressure of the system, the alarm device 36 is maintained in a deactivated condition. Upon rupture of any one of the heat sensitive conduits comprising the heat detection and alarm apparatus 10, a reduction in the system pressure is immediately detected by the pressure switch 38. The reduction of the pressure of the fluid flowing through conduits 16 and 42 closes the contacts of the pressure switch 38 to thereby complete the electrical connection between the power source 40 and the alarm device 36. The alarm device is thus actuated to indicate the presence of an alarm condition, which may be either an undesirably high temperature or a fire which caused the rupture of any one of the heat sensitive conduits.

For a heat detection and alarm system utilizing a continuous source of pressurized fluid, a flow restrictor 46 is provided on the supply conduit 16 between the conduit 42 supplying the fluid to the pressure switch 38 and the input conduit 20. The flow restrictor 46 is operable to prevent a surge in the fluid pressure within the conduits 16 and 20 from opening the contacts of the pressure switch 38 when an alarm condition has occurred and the contacts of the device 38 have been closed to actuate the alarm 36.

The heat sensitive conduits 12 and the branch conduits 26–32 extending therefrom, as described hereinabove, are fabricated from a heat sensitive thermoplastic material. The end portions of the conduits are sealed to thereby maintain a preselected fluid pressure therein, as determined by the fluid pressure of the system. The temperature at which the conduits soften and eventually rupture is dependent upon the type of thermoplastic material from which the conduits are fabricated, the conduit diameter and wall thickness, and the fluid pressure maintained in the conduits. Therefore, by selecting a conduit material of a given diameter and thickness, the conduit may be designed to rupture at a preselected temperature for a specific fluid pressure in the conduits.

Figure 2:
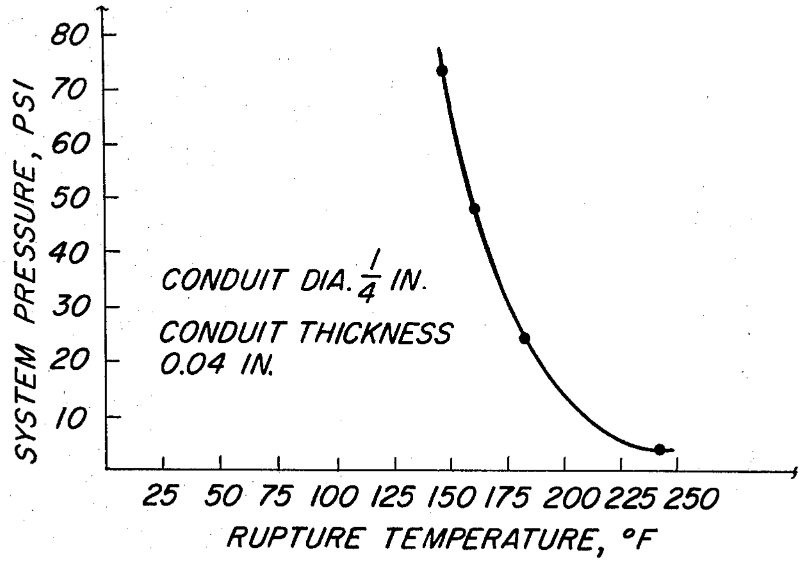
FIG. 2 is a diagrammatic representation, illustrating the range of temperatures for which the heat sensitive conduits of a preselected thickness will rupture with a preselected fluid pressure maintained therein.

Referring to FIG. 2, there is illustrated diagrammatically, the relationship between the system pressure and the temperature at which the heat sensitive conduits will rupture for a polyethylene conduit ¼ inch in diameter with a wall thickness of 0.04 inches. Thus, for the system pressure of 75 p.s.i., the heat sensitive conduits will soften and rupture at 145° F. Accordingly, the conduits will rupture at a temperature of 165° F. for a system pressure of 50 p.s.i. maintained in the heat sensitive conduits 12 and 26–32. With a pressure of 25 p.s.i. maintained in the conduits, softening and rupture of the conduits occurs at 180° F. and for a system pressure of 5 p.s.i., the conduits will rupture at a temperature of 245° F. Consequently, for a given material and a conduit of a selected diameter and wall thickness, it is possible to provide a heat detection and alarm system in which the heat sensitive conduits rupture at a desired temperature, as determined by the fluid pressure in the conduits.

The temperature at which the conduits rupture may be the temperature at which a material ignites and bursts into flame or at an undesirably high temperature which exceeds a safe predetermined temperature. In each case, upon rupture of the conduits, the fluid in the system, which may include a fire retardant material, such as water, will be discharged to extinguish the flame or reduce the excessive temperature to a safe temperature. In both cases, however, rupture of the heat sensitive conduits actuates the alarm device 36 by closing of the contacts of the pressure switch 38 in response to the decrease in pressure within the system when a conduit ruptures and the fluid is discharged from the conduit. Accordingly, the alarm device 36 is actuated and a suitable alarm signal is transmitted to indicate the alarm condition. In this manner, a fire retardant material is discharged upon a localized area simultaneously with actuation of the alarm device 36.

In a further embodiment of the present invention, actuation of an alarm signal may be accompanied by the automatic initiation of a shutdown procedure requiring immediate corrective action necessitated, for example, by the failure of heat insulation resulting in either an undesirably high temperature surrounding the heat source or combustion of the insulation. As part of an automatic shutdown procedure, a plurality of pressure switches may be located in the branch conduits 26–32 by which the exact location of the fire or overheating can be determined. Accordingly, the occurrence of fire or overheating actuates a suitable alarm signal for indicating the exact location of the alarm condition in much the same manner as the pressure switch 38 and alarm device 36.

Figure 3:
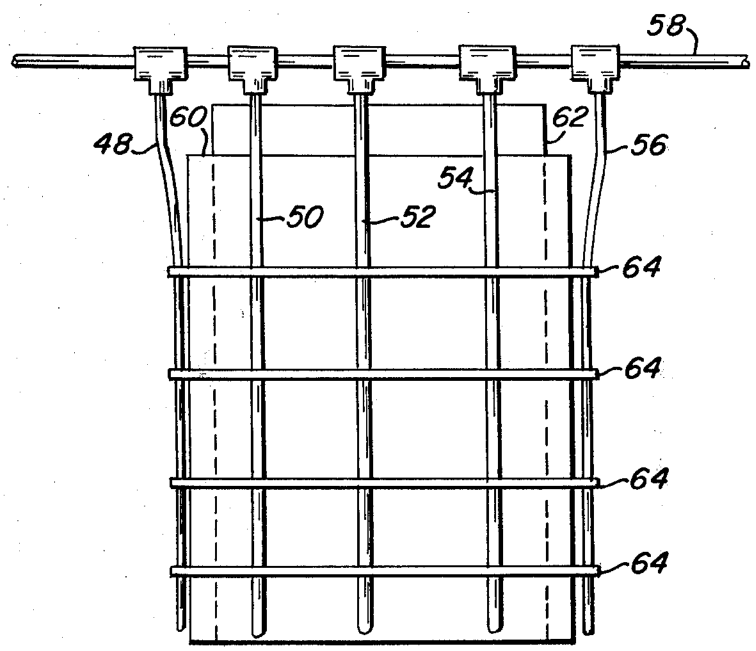
FIG. 3 is a schematic representation of the heat detection and alarm apparatus shown in FIG. 1, illustrating a plurality of heat sensitive branch conduits positioned in substantially abutting relation with the insulation surrounding a source of heat for monitoring the temperature of the outer surface of the insulation.

Referring to FIG. 3, there is illustrated an additional embodiment of the present invention in which a plurality of pressurized heat sensitive conduits 48, 50, 52 and 54 and 56 extend downwardly from a branch heat sensitive conduit 58 included within the heat detection and alarm apparatus 10. The conduits 48–56 are positioned in surrounding relation with insulation 60 that surrounds a tank 62 in which high temperature fluids are stored. The heat sensitive conduits are maintained in substantially abutting relation with the insulation material 60 by suitable means, such as straps 64 that encircle the conduits and the insulated tank 62. With this arrangement, in the event that an undesirable hot spot should occur on the surface of the insulation 60, the specific heat sensitive conduit adjacent the hot spot will rupture when a preselected temperature is exceeded, as determined by the size of the conduit and the system pressure.

Rupture of one of the conduits results in reduction in the system pressure. The pressure switch 38 responds to the pressure drop by closing of the contacts of the electrical circuit connecting the alarm device 36 to the electrical power source 40. Thus, the alarm 36 is actuated to transmit a signal indicating an alarm condition. Also, a shutdown procedure is automatically initiated due to the occurrence of the high temperature. As illustrated in FIG. 3, conduits may be arranged in any desired configuration in surrounding relation with the heat source to monitor the temperature of the insulation material. The heat sensitive conduits are operable to rupture at any point along the length thereof when exposed to the rupture temperature, as determined by the system pressure. Therefore, the occurrence of a hot spot or flame remote from the branch conduit 58 is detected by any one of the other conduits 48–56 positioned substantially in abutting relation with the hot spot. In this manner, the undesirably high temperature or fire is immediately detected before it magnifies into an uncontrollable condition. In addition, with a fire retardant liquid maintained under pressure within the conduits, rupture of a conduit discharges the liquid upon the hot spot to either reduce the temperature to a safe, predetermined level or extinguish a flame should the insulation ignite.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Heat detection and alarm apparatus comprising,
a pressurized source of fire retardant liquid,
a heat sensitive conduit for transporting said fire retardant liquid and having sealed end portions such that said conduit is operable to rupture when the temperature thereof exceeds a preselected level,
said heat sensitive conduit positioned adjacent a source of heat such that an increase in temperature thereof above a preselected level is operable to rupture said heat sensitive conduit and thereby discharge said fire retardant liquid upon the source of heat to reduce the temperature to a safe predetermined level,
conduit means for connecting said heat sensitive conduit with said pressurized source of fire retardant liquid to maintain a selected liquid pressure in said heat sensitive conduit,
alarm means responsive to a decrease in the liquid pressure within said conduit means for transmitting a signal to indicate rupture of said heat sensitive conduit,
pressure responsive means connected to said conduit means for maintaining said alarm means in a deactivated condition, and
said pressure responsive means operable upon rupture of said heat sensitive conduit and a subsequent reduction of the liquid pressure in said conduit means to actuate said alarm means and indicate the presence of an elevated temperature.

2. Heat detection and alarm apparatus as set forth in claim 1 which includes,
a plurality of branch heat sensitive conduits connected to said sensitive conduit and having sealed end portions to maintain a selected liquid pressure therein, and
said branch heat sensitive conduits being arranged in substantial abutting relationship with the surface of an object to be monitored for temperature in excess of a preselected level to permit discharge of said fire retardant liquid upon said surface when said conduits rupture at said preselected temperature.

3. Heat detection and alarm apparatus as set forth in claim 1 which includes,
flow resistor means for preventing the pressurized fluid from maintaining sufficient pressure on said pressure responsive means to restore said alarm means to a deactivated condition after rupture of said heat sensitive conduit, and
said flow resistor means operably connected to said conduit means between said pressurized source of liquid and said pressure responsive means.

4. Heat detection and alarm apparatus as set forth in claim 1 which includes,
said heat sensitive conduit being fabricated of a thermoplastic material having a preselected diameter and wall thickness, and
said thermoplastic material operable to rupture at a preselected temperature corresponding to a preselected liquid pressure maintained in said heat sensitive conduit to permit discharge of said fire retardant liquid upon a source of heat.

5. Heat detection and alarm apparatus as set forth in claim 4 which includes,
said heat sensitive thermoplastic conduit having a polyethylene composition.

6. Heat detection and alarm apparatus as set forth in claim 1 which includes,
said heat sensitive conduit positioned adjacent a source of heat such that occurence of fire is operable to rupture said heat sensitive conduit and thereby discharge the fire retardant liquid to extinguish a fire.

7. Heat detection and alarm apparatus as set forth in claim 1 which includes,
an electrical power source connected to said alarm means,
said pressure responsive means electrically connected between said power source and said alarm means,
said pressure responsive means having normally open contacts to prevent the flow of current from said electrical power source to said alarm means for actuating said alarm means, and
said contacts arranged to close upon a decrease in pressure through said conduit means as a consequence of the rupture of said heat sensitive conduit and thereby supply electrical power to said alarm to actuate said alarm means and indicate the presence of an alarm condition.

* * * * *